US012322070B1

(12) United States Patent
Li et al.

(10) Patent No.: US 12,322,070 B1
(45) Date of Patent: Jun. 3, 2025

(54) SYSTEM AND METHOD FOR HYPERSPECTRAL IMAGE GENERATION WITH QUALITY ASSURANCE

(71) Applicant: AtomBeam Technologies Inc., Moraga, CA (US)

(72) Inventors: Zhu Li, Overland Park, KS (US); Paras Maharjan, Kansas City, MO (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 18/981,623

(22) Filed: Dec. 15, 2024

Related U.S. Application Data

(63) Continuation-in-part of application No. 18/627,451, filed on Apr. 5, 2024, now Pat. No. 12,190,573.

(51) Int. Cl.
  *G06T 5/60* (2024.01)
  *G06T 5/50* (2006.01)
  *G06T 7/00* (2017.01)

(52) U.S. Cl.
  CPC .......... *G06T 5/60* (2024.01); *G06T 5/50* (2013.01); *G06T 7/0002* (2013.01); *G06T 2207/10024* (2013.01); *G06T 2207/10036* (2013.01); *G06T 2207/20081* (2013.01); *G06T 2207/20084* (2013.01); *G06T 2207/30168* (2013.01)

(58) Field of Classification Search
  None
  See application file for complete search history.

(56) References Cited

U.S. PATENT DOCUMENTS

| | | |
|---|---|---|
| 10,580,170 B2 | 3/2020 | Robles-Kelly |
| 2021/0364355 A1 | 11/2021 | Ben-Shahar et al. |
| 2022/0366536 A1 | 11/2022 | Li et al. |
| 2022/0405972 A1 | 12/2022 | Sartor et al. |
| 2024/0096080 A1 | 3/2024 | Deshpande et al. |
| 2024/0290008 A1 * | 8/2024 | Panetta ..................... G06T 5/50 |

FOREIGN PATENT DOCUMENTS

WO  WO-2023164271 A1 *  8/2023

OTHER PUBLICATIONS

Arad, Boaz et al, "NTIRE 2020 Challenge on Spectral Reconstruction from an RBG Image," (Year: 2020).

(Continued)

*Primary Examiner* — Ian L Lemieux
(74) *Attorney, Agent, or Firm* — Galvin Patent Law LLC; Brian R. Galvin

(57) ABSTRACT

A system and method are disclosed for generating hyperspectral images from RGB (red-green-blue) images. A set of data includes training hyperspectral images and their corresponding RGB images. A spectral band grouping is performed on the training hyperspectral images based on a correlation coefficient of spectral bands. A decomposition network generates a reconstructed hyperspectral image, while a fine-tuning network creates reconstructed RGB images. A quality assurance system analyzes spectral consistency, noise levels, and RGB reconstruction accuracy to generate quality metrics. These metrics guide network weight adjustments to improve reconstruction accuracy.

17 Claims, 11 Drawing Sheets

(56) References Cited

OTHER PUBLICATIONS

Lin, Yi-Tun and Finlayson, Graham D., "Physically Plausible Spectral Reconstruction from RGB Images," (Year: 2020).
Lorenzo, P. Ribalta et al., "Hyperspectral Band Selection Using Attention-Based Convolutional Neural Networks," in IEEE Access, vol. 8, pp. 42384-42403, 2020, doi: 10.1109/ACCESS.2020.2977454. (Year: 2020).

\* cited by examiner

SYSTEM AND METHOD FOR HYPERSPECTRAL IMAGE GENERATION WITH QUALITY ASSURANCE

CROSS-REFERENCE TO RELATED APPLICATIONS

Priority is claimed in the application data sheet to the following patents or patent applications, each of which is expressly incorporated herein by reference in its entirety: Ser. No. 18/627,451

BACKGROUND OF THE INVENTION

Field of the Art

The present invention is in the field of image processing, and more particularly is directed to the problem of obtaining hyperspectral images.

Discussion of the State of the Art

Hyperspectral imaging is an imaging technique used in various fields such as remote sensing, agriculture, environmental monitoring, forensics, food manufacturing, and medical imaging. Unlike traditional imaging techniques which capture data in three color bands (red, green, and blue), hyperspectral imaging collects and processes information across hundreds or even thousands of narrow contiguous spectral bands. Each pixel in a hyperspectral image contains a spectrum of information across the electromagnetic spectrum, providing detailed spectral signatures for different materials or substances. The spectral information allows for more precise identification and analysis of objects or substances based on their spectral characteristics. Hyperspectral images provide a wealth of information about the composition and properties of the objects or scenes being imaged, making them valuable tools for applications ranging from geological surveys to food quality assessment and disease diagnosis. Overall, hyperspectral imaging can provide detailed information about the composition and properties of the imaged objects or areas, making hyperspectral imaging an important tool for a wide variety of industries and applications.

SUMMARY OF THE INVENTION

Accordingly, there is disclosed herein, systems and methods for generating hyperspectral images from RGB (red-green-blue) images with quality assurance. A set of data includes training hyperspectral images and their corresponding RGB images. A spectral band grouping is performed on the training hyperspectral images based on a correlation coefficient of spectral bands. A decomposition network is used to generate a reconstructed hyperspectral image. A fine-tuning network is used to create a reconstructed RGB images. The difference between an input RGB image and a corresponding reconstructed RGB image is used to adjust one or more weights of one or more of the networks, thereby improving the accuracy and efficacy of reconstructed hyperspectral images.

In traditional hyperspectral image acquisition, dedicated hardware, such as a hyperspectral camera, may be used. A hyperspectral camera can include special-purpose hardware, making it potentially expensive and/or difficult to use or maintain. That is, due to the limitations of imaging technologies, acquiring hyperspectral images can be more difficult than acquiring RGB images. For example, conventional spectrometers often operate in a spectral or spatial scanning manner, which can be time consuming. Furthermore, the hyperspectral cameras and/or other spectroscopy equipment can be quite expensive and complex, making it unsuitable for use in various scenarios.

Disclosed embodiments address the aforementioned problems and shortcomings by performing spectral super-resolution techniques utilizing one or more neural networks. Once the neural networks are trained, reconstructed hyperspectral images can be obtained from input RGB images, thereby simplifying the task of obtaining hyperspectral images. Disclosed embodiments alleviate the need for excessive special-purpose hardware, and can greatly reduce the overall cost of acquiring hyperspectral images.

According to a preferred embodiment, a system for hyperspectral image generation with quality assurance, comprising: a computing device comprising at least a memory and a processor; a spectral band grouping module comprising a first plurality of programming instructions that, when operating on the processor, cause the computing device to: obtain a training hyperspectral image; identify a plurality of spectral bands in the training hyperspectral image; compute a correlation coefficient of each spectral band of the plurality of spectral bands to at least one other spectral band of the plurality of spectral bands; and form a plurality of spectral domain groups based on the computed correlation coefficients; a decomposition module comprising a second plurality of programming instructions that, when operating on the processor, cause the computing device to: obtain the plurality of spectral domain groups from the spectral band grouping module; obtain an RGB (red-green-blue) input image; provide the RGB input image and plurality of spectral domain groups to a first neural network, wherein the first neural network includes at least one convolutional block, and at least one residual block; and obtain as an output of the first neural network, a reconstructed hyperspectral image, based on the RGB input image; and a quality assurance subsystem comprising a third plurality of programming instructions that, when operating on the processor, cause the computing device to: obtain the RGB input image, the reconstructed hyperspectral image, and a reconstructed RGB image; analyze a spectral consistency of the reconstructed hyperspectral image; evaluate a RGB reconstruction accuracy between the RGB input image and the reconstructed RGB image; analyze a plurality of noise characteristics in the reconstructed hyperspectral image and the reconstructed RGB image; generate a plurality of quality scores based on the spectral consistency, the RGB reconstruction accuracy, and the noise characteristics; compare the plurality of quality scores against a predetermined quality threshold; and update the first neural network based on the quality score comparisons, is disclosed.

According to another preferred embodiment, a method for hyperspectral image generation with quality assurance, comprising steps of: obtaining a training hyperspectral image; identifying a plurality of spectral bands in the training hyperspectral image; computing a correlation coefficient of each spectral band of the plurality of spectral bands to at least one other spectral band of the plurality of spectral bands; forming a plurality of spectral domain groups based on the computed correlation coefficients; obtaining an RGB (red-green-blue) input image; providing the RGB input image and plurality of spectral domain groups to a first neural network, wherein the first neural network includes at least one convolutional block, and at least one residual block; obtaining as an output of the first neural network, a reconstructed hyperspectral image, based on the RGB input image; forwarding the RGB input image, the reconstructed hyperspectral image, and a reconstructed RGB image to a quality assurance subsystem; analyzing a spectral consistency of the reconstructed hyperspectral image; evaluating a RGB reconstruction accuracy between the RGB input image and the reconstructed RGB image; analyzing a plurality of noise characteristics in the reconstructed hyperspectral image and the reconstructed RGB image; generating a plurality of quality scores based on the spectral consistency, the RGB reconstruction accuracy, and the noise characteristics; comparing the plurality of quality scores against a predetermined quality threshold; and updating the first neural network based on the quality score comparisons, is disclosed.

According to an aspect of an embodiment, the at least one residual block comprises at least two convolutional layers.

According to an aspect of an embodiment, for each convolutional layer, a corresponding kernel size for the convolutional layer is set to 3×3.

According to an aspect of an embodiment, the first neural network further comprises an activation function.

According to an aspect of an embodiment, the activation function comprises a ReLU layer.

According to an aspect of an embodiment, the second neural network comprises a self-supervised network.

According to an aspect of an embodiment, there is provided a first convolutional layer from the at least two convolutional layers that is configured to perform feature extraction.

According to an aspect of an embodiment, there is provided a second convolutional layer from the at least two convolutional layers that is configured to perform feature map dimension reduction.

BRIEF DESCRIPTION OF THE DRAWING FIGURES

Figure 1:
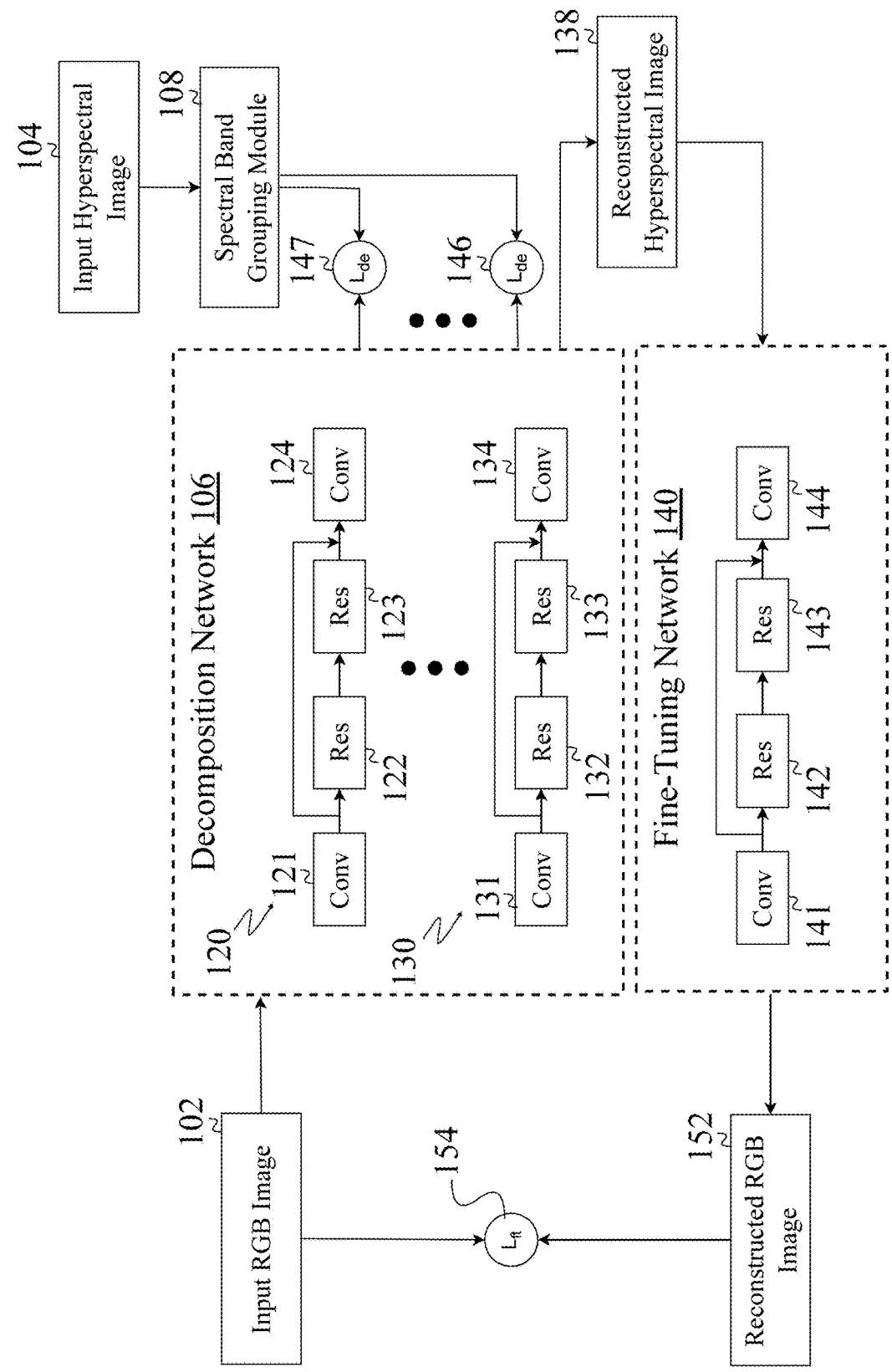
FIG. 1 is a block diagram illustrating components for hyperspectral image generation utilizing a decomposition network and a fine-tuning network, according to an embodiment.

The drawings are not necessarily to scale. The drawings are merely schematic representations, not intended to portray specific parameters of the disclosed embodiments. The drawings are intended to depict only typical embodiments of the invention, and therefore should not be considered as limiting in scope.

DETAILED DESCRIPTION OF THE INVENTION

Commercially available digital cameras are capable of capturing RGB (red-green-blue) images by mapping the spectrum of acquired image data to the red, green, and blue spectral bands, leaving much of the available spectrum ignored. In contrast, hyperspectral images often contain in excess of ten spectral bands. This rich spectral information is beneficial for numerous computer vision functions, such as facial recognition and object tracking. However, direct acquisition of hyperspectral images from spectrometers and/or hyperspectral cameras can be costly and time consuming.

Disclosed embodiments address the aforementioned issues with a novel approach that includes reconstructing hyperspectral images from corresponding RGB images by taking advantage of spectral super-resolution algorithms. Disclosed embodiments utilize multiple neural networks to improve the modeling of the complex mapping relationship between RGB images and their corresponding hyperspectral images. This enables the use of conventional RGB image acquisition devices that are plentiful, fast, and economical, for the data acquisition component of disclosed embodiments. Then, the processing of the conventional RGB image data performed by disclosed embodiments generates an accurate reconstructed hyperspectral image, enabling the efficient use of hyperspectral images in a wide variety of applications.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "bit" refers to the smallest unit of information that can be stored or transmitted. It is in the form of a binary digit (either 0 or 1). In terms of hardware, the bit is represented as an electrical signal that is either off (representing 0) or on (representing 1).

The term "pixel" refers to the smallest controllable element of a digital image. It is a single point in a raster image, which is a grid of individual pixels that together form an image. Each pixel has its own color and brightness value, and when combined with other pixels, they create the visual representation of an image on a display device such as a computer monitor or a smartphone screen.

The term "neural network" refers to a computer system modeled after the network of neurons found in a human brain. The neural network is composed of interconnected nodes, called artificial neurons or units, that work together to process complex information.

The term "hyperspectral image" refers to an image in which each pixel of the image includes multiple (generally more than three) spectral bands from across the electromagnetic (EM) spectrum.

Conceptual Architecture

Figure 7:
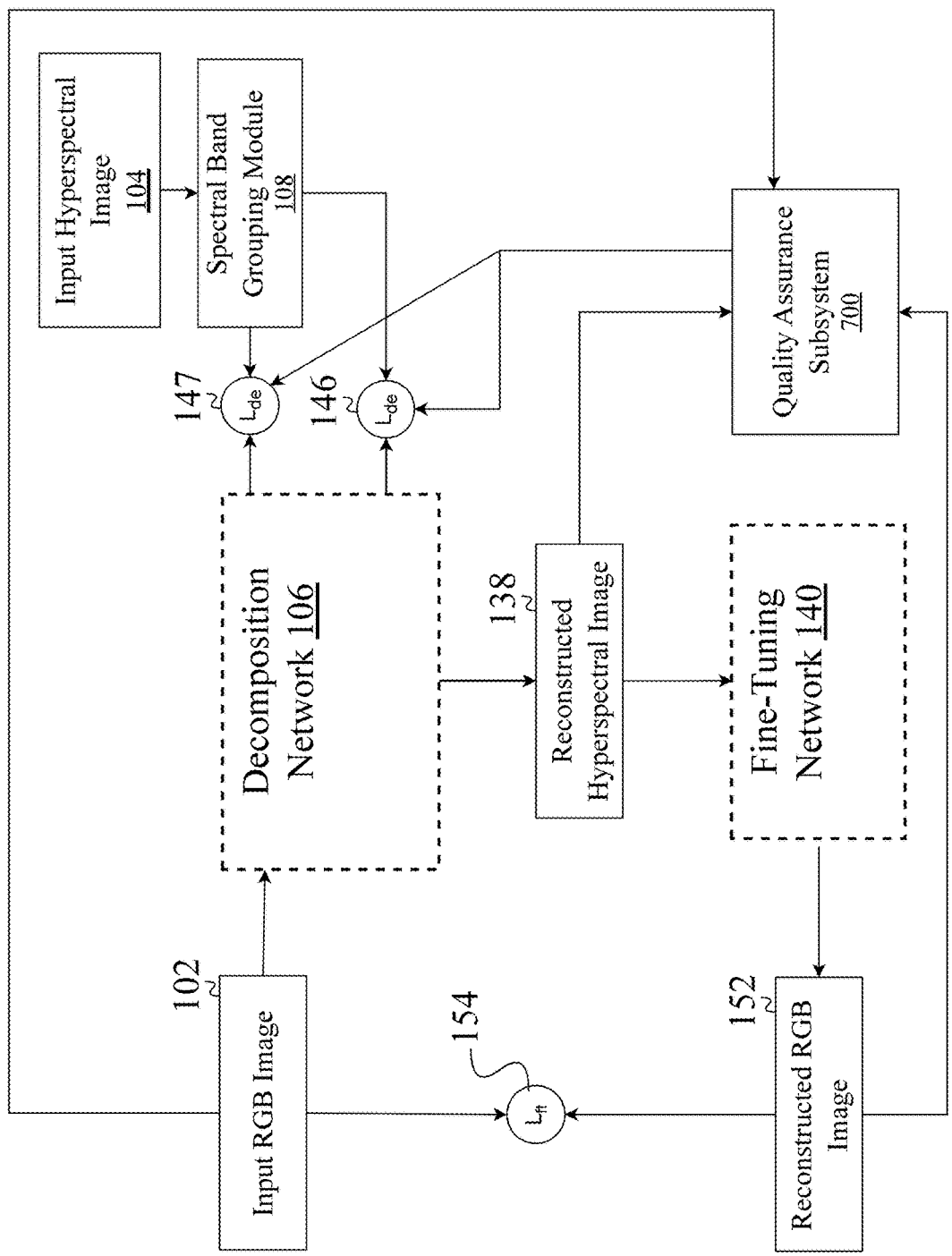
FIG. 7 is a block diagram a system for hyperspectral image generation utilizing a decomposition network and a fine-tuning network with quality assurance, according to an embodiment.

FIG. 7 is a block diagram a system for hyperspectral image generation utilizing a decomposition network and a fine-tuning network with quality assurance, according to an embodiment. The input RGB image 102 is an RGB version of hyperspectral image 104. In one or more embodiments, the input RGB image 102 may be in a bayer format. Images in the bayer format may comprise multiple sets of four pixels. Each set includes a red pixel, a blue pixel, and two green pixels. This arrangement is based on the fact that the human eye is more sensitive to green light than to red or blue.

Input hyperspectral image 104 may include multiple spectral bands. In embodiments, the input hyperspectral image can include between 10 to 32 spectral bands. Other embodiments may include more or fewer spectral bands. In one or more embodiments, the input hyperspectral image comprises 31 spectral bands ranging from 400 nm to 700 nm with a 10 nm interval.

Input hyperspectral image 104 is input to spectral band grouping module 108. Spectral band grouping module 108 can include instructions and/or functions that including but not limited to computing a correlation coefficient of each spectral band of the plurality of spectral bands to at least one other spectral band of the plurality of spectral bands or forming a plurality of spectral domain groups based on the computed correlation coefficients.

Decomposition network 106 generates a reconstructed hyperspectral image 138 based on the input RGB image 102 and spectral band grouping information. The reconstructed hyperspectral image 138 is then input to the fine-tuning network 140, which generates a reconstructed RGB image 152. The reconstructed RGB image 152 is compared with the input RGB image 102, with differences embodied in a corresponding loss function for the fine-tuning network 140, represented as $L_{ft}$, indicated at 154.

A quality assurance subsystem 700 receives three inputs: the input RGB image 102, the reconstructed hyperspectral image 138, and the reconstructed RGB image 152. The subsystem analyzes spectral consistency by computing correlation coefficients between adjacent spectral bands in the reconstructed hyperspectral image 138. It also evaluates noise levels and performs artifact detection across the reconstructed images. The subsystem compares the reconstructed RGB image 152 with the input RGB image 102 using pixel-wise comparison and structural similarity metrics.

The quality assurance subsystem 700 generates quality metrics that are used to adjust the weights of both the decomposition network 106 and fine-tuning network 140. These adjustments are represented by the loss functions $L_{de}$ indicated at 146 and 147. The quality metrics provide additional guidance beyond the basic RGB comparison, ensuring both spectral accuracy and image quality in the reconstruction process. This comprehensive quality assessment helps maintain the integrity of the hyperspectral image generation while minimizing artifacts and noise in the output.

In one or more embodiments, the quality assurance subsystem 700 implements predetermined quality thresholds for spectral consistency, noise levels, and RGB accuracy. When these thresholds are not met, the subsystem provides specific feedback signals to guide the adjustment of network weights, enabling targeted improvements in the reconstruction process. This feedback loop ensures continuous refinement of the network's performance and maintains high-quality output in the generated hyperspectral images.

Figure 8:
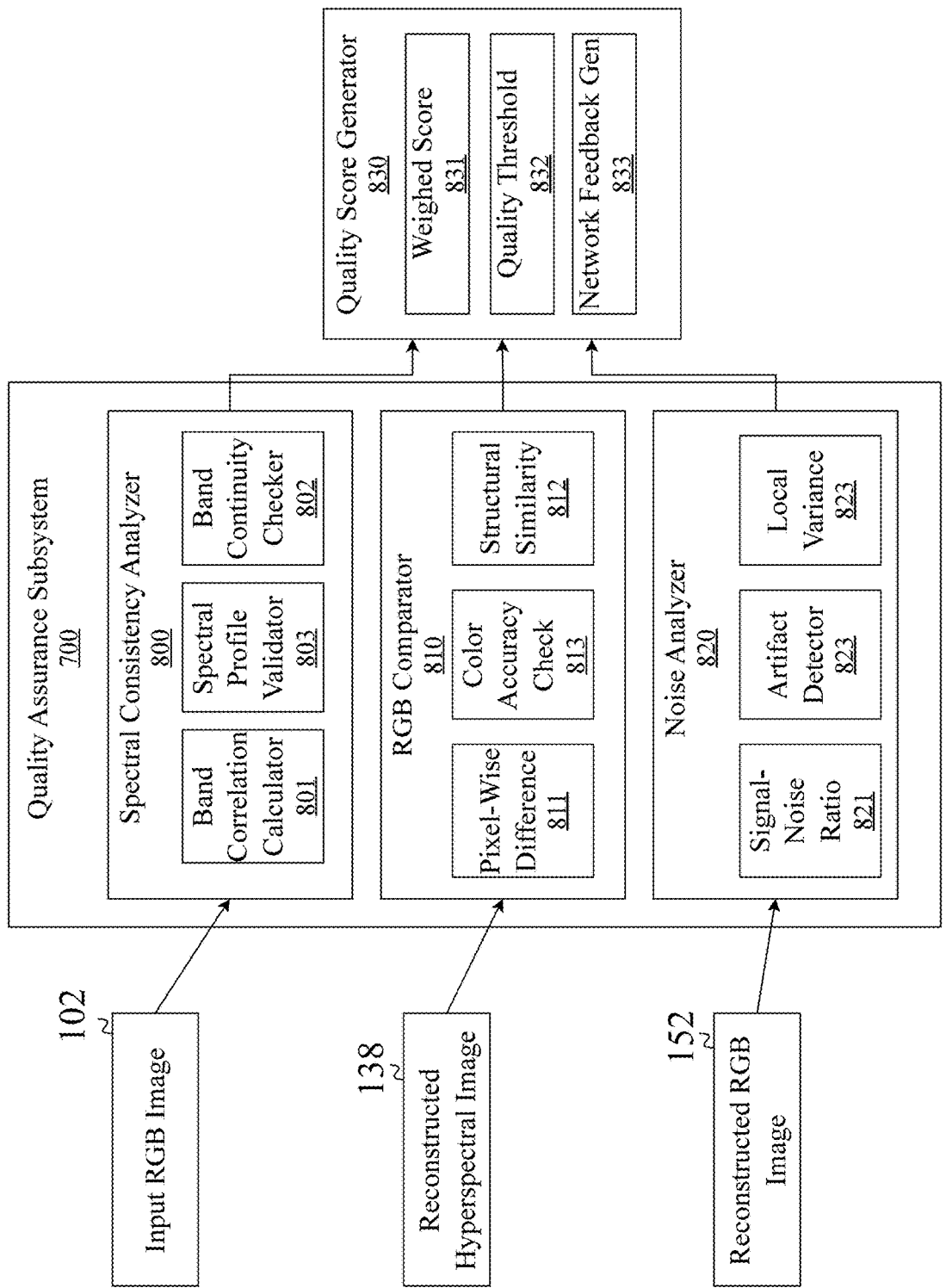
FIG. 8 is a block diagram illustrating a component for hyperspectral image generation utilizing a decomposition network and a fine-tuning network with quality assurance, a quality assurance subsystem, according to an embodiment.

FIG. 8 is a block diagram illustrating a component for hyperspectral image generation utilizing a decomposition network and a fine-tuning network with quality assurance, a quality assurance subsystem, according to an embodiment. The subsystem comprises a plurality of components, including but not limited to a spectral consistency analyzer 800, an RGB comparator 810, a noise analyzer 820, and a quality score generator 830, each performing specialized analysis functions to ensure the quality of the hyperspectral image generation process.

A spectral consistency analyzer 800 evaluates the spectral characteristics of the reconstructed hyperspectral image. A band correlation calculator 801 computes correlation coefficients between adjacent spectral bands, quantifying the relationship between neighboring wavelengths. This correlation analysis helps identify discontinuities or anomalies in the spectral reconstruction. In one embodiment, the correlation computation is performed by flattening each spectral band into a one-dimensional array and calculating the Pearson correlation coefficient between adjacent bands. When the correlation falls below a predetermined threshold, the system flags these locations as potential anomalies requiring further analysis or correction. A band continuity checker 802 examines the smoothness of transitions between spectral bands, ensuring that the reconstructed spectrum maintains natural gradations without artificial discontinuities. In one embodiment this examination is accomplished by calculating first and second derivatives between spectral bands, where the first derivative measures the rate of change between bands, and the second derivative identifies sudden changes in this rate. The system computes smoothness scores using these derivatives and flags locations where the smoothness exceeds a defined threshold, indicating potentially problematic transitions.

A spectral profile validator 803 analyzes the overall shape and characteristics of the spectral signatures, comparing them against expected patterns for various materials and surfaces. This validation, in one embodiment, may be performed using Dynamic Time Warping (DTW), a technique that allows flexible matching of spectral shapes against a database of known spectral signatures for various materials. The DTW algorithm can identify anomalous profiles that don't match expected patterns while accounting for variations in spectral intensity, providing similarity scores that quantify how well each reconstructed profile matches known patterns. The combined analysis from these components enables both qualitative assessment and quantitative measurement of the spectral reconstruction quality, providing specific metrics that can be used to adjust the neural network weights during training and validation.

An RGB comparator 810 performs a comprehensive analysis of the RGB reconstruction accuracy through a plurality of possible approaches. In one embodiment, a pixel-wise difference calculator 811 computes direct numerical differences between corresponding pixels in the reconstructed and input RGB images, providing a baseline measure of reconstruction accuracy. This calculation may be performed by computing Mean Squared Error (MSE) and Peak Signal-to-Noise Ratio (PSNR) between the images. The MSE is calculated by squaring the difference between each corresponding pixel value and averaging over all pixels, while PSNR is derived using the logarithmic relationship between the maximum possible pixel value and the MSE, typically expressed in decibels. In another embodiment, a structural similarity analyzer 812 evaluates the preservation of image features and patterns, ensuring that the spatial structure of the original image is maintained in the reconstruction. This evaluation may employ the Structural Similarity Index Measure (SSIM) algorithm, which analyzes local windows of the images using a combination of luminance comparison (using local mean intensity), contrast comparison (using local standard deviation), and structure comparison (using local normalized pixels). The SSIM computation includes Gaussian weighting for each window and operates at multiple scales to capture both fine and coarse image structures.

In another embodiment, a color accuracy checker 813 specifically focuses on the fidelity of color reproduction, examining how well the reconstructed image preserves the original color relationships and intensities. This examination is conducted in multiple color spaces, including RGB, to comprehensively assess color accuracy. The color checker may also analyze color histogram distributions and color moment statistics (mean, standard deviation, and skewness) for each color channel to ensure consistent color reproduction across the entire image. RGB comparator 810 may utilize any plurality of these approaches to achieve its comprehensive analysis. When more than one approach is used, the approaches findings are compounded to provide a comprehensive quantitative assessment of reconstruction quality, generating scores that can be weighted and combined to guide the fine-tuning process of the neural networks.

A noise analyzer 820 assesses the quality of the reconstructed images through multiple metrics. A signal-to-noise ratio (SNR) calculator 821 quantifies the relationship between the desired image content and unwanted variations or noise. This quantification may be performed using a multi-scale approach where the image is decomposed into frequency bands using wavelet transformation, allowing separate noise analysis at different spatial scales. The SNR is calculated for each spectral band using the ratio between the mean signal power and the noise power estimate, derived from the wavelet coefficients at each decomposition level. Additionally, a blind/referenceless image spatial quality evaluator may be employed to provide a no-reference quality score based on statistical features of the locally normalized luminance coefficients. An artifact detector 822 identifies and characterizes any reconstruction artifacts or anomalies that may appear in the output images. This detection process in one embodiment uses a convolutional neural network trained on common reconstruction artifacts (blocking, ringing, blurring) to generate artifact probability maps. The detector also utilizes gradient analysis to identify sharp transitions or discontinuities that may indicate reconstruction errors, and performs frequency domain analysis using Fourier transforms to detect periodic artifacts or unusual frequency patterns.

A local variance analyzer 823 examines spatial variations across different regions of the images to identify areas of potential quality degradation or inconsistent reconstruction. This examination is conducted by calculating local statistical measures within sliding windows across the image, including variance, entropy, and higher-order moments. The analyzer employs adaptive thresholding based on local content characteristics to identify regions with abnormal variation patterns, and uses a multi-resolution approach to capture both fine-scale noise and larger-scale structural variations. The system may also compute spatial frequency response (SFR) measurements to evaluate the preservation of fine details and edges across different image regions, providing a comprehensive assessment of spatial quality consistency.

A quality score generator 830 integrates the outputs from all analysis components to produce final quality metrics and feedback signals. A weighted score calculator 831 combines the various quality metrics using predetermined weights to generate a comprehensive quality score. This combination process implements an adaptive weighting scheme where each metric's weight is dynamically adjusted based on its statistical reliability and historical performance. The weights are updated using a moving average of metric consistency scores. In one embodiment, quality score generator 830 may employ Bayesian optimization to periodically refine these weights based on correlations between metric values and final reconstruction quality. A quality threshold validator 832 compares these scores against established thresholds to determine if the reconstruction meets quality standards. The validation process utilizes a multi-threshold approach where different aspects of quality (spectral, spatial, and color accuracy) have individual threshold requirements, derived from statistical analysis of high-quality reconstructions. The validator implements a hierarchical decision tree where primary quality indicators must meet strict thresholds while secondary metrics have more flexible bounds that adapt to image content complexity.

A network feedback generator 833 creates specific feedback signals for adjusting the weights of both the decomposition network and fine-tuning network based on the quality analysis results. These feedback signals may be generated through a gradient-based approach where quality metrics are transformed into loss terms that can directly influence network optimization. The generator may compute partial derivatives for each network weight with respect to the quality score, enabling targeted weight adjustments. It also implements an importance sampling mechanism to prioritize adjustments that have historically led to the most significant quality improvements, using a reinforcement learning approach to optimize the feedback strategy over time. The feedback signals are normalized and scaled based on the current training phase and network sensitivity to prevent oscillation or overshooting in the weight adjustment process.

In operation, the quality assurance subsystem processes all three input images simultaneously through its various analyzers. Spectral consistency analyzer 800 focuses primarily on the reconstructed hyperspectral image 138, ensuring the spectral reconstruction maintains physical validity and consistency. RGB comparator 810 works with both the input RGB image 102 and reconstructed RGB image 152 to validate the accuracy of the RGB reconstruction process. Noise analyzer 820 examines both the hyperspectral and RGB reconstructions to identify and quantify any quality issues.

The feedback signals generated by the network feedback generator 833 are used to adjust the weights of the neural networks in the main system. These adjustments are made through the loss functions to optimize both the spectral reconstruction accuracy and the RGB reproduction quality. The quality threshold validator 832 ensures that the reconstruction meets predetermined quality standards before the results are accepted, providing a quality control mechanism for the entire hyperspectral image generation process.

FIG. 1 is a block diagram illustrating components for hyperspectral image generation utilizing a decomposition network and a fine-tuning network, according to an embodiment. An input hyperspectral image 104 and corresponding input RGB image 102 are used as training data for decomposition network 106. The input RGB image 102 is an RGB version of the hyperspectral image 104. In one or more embodiments, the input RGB image 102 may be in a Bayer format. A Bayer raw image is a type of image format that may be used in digital cameras and other imaging devices. Images in the Bayer format may comprise multiple sets of four pixels. Each set includes a red pixel, a blue pixel, and two green pixels. This arrangement is based on the fact that the human eye is more sensitive to green light than to red or blue. One or more embodiments may utilize other formats for the input RGB image. In one or more embodiments, the input RGB image 102 may include bitmaps, tagged image file format (TIFF), and/or other raw formats.

The input hyperspectral image 104 can include multiple spectral bands. In embodiments, the input hyperspectral image can include between 10 to 32 spectral bands. Other embodiments may include more or fewer spectral bands. In one or more embodiments, the input hyperspectral image comprises 31 spectral bands ranging from 400 nm to 700 nm with a 10 nm interval.

The input hyperspectral image 104 is input to spectral band grouping module 108. Spectral band grouping module 108 can include instructions and/or functions, that when executed by a processor, perform functions including computing a correlation coefficient of each spectral band of the plurality of spectral bands to at least one other spectral band of the plurality of spectral bands; and forming a plurality of spectral domain groups based on the computed correlation coefficients.

Figure 2:
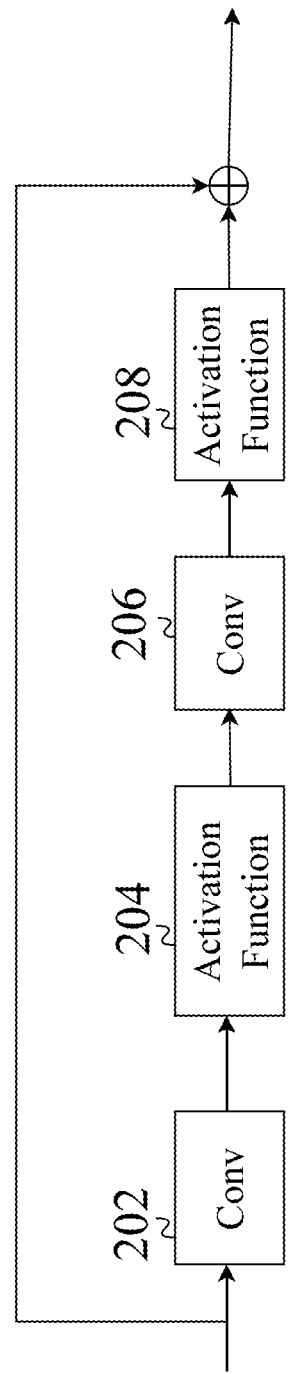
FIG. 2 is a block diagram showing additional details of a residual block shown in FIG. 1, according to an embodiment.

One or more embodiments can enable reconstructing a hyperspectral image denoted as:

$$Y \in \mathbb{R}^{w \times h \times L}$$

from its corresponding RGB image which is denoted as:

$$X \in \mathbb{R}^{w \times h \times 3}$$

Where L represents the number of spectral bands in the hyperspectral image, where L is greater than three, and w and h denote the width and height of the two images, respectively. In one or more embodiments, for any two bands in the hyperspectral image, the bands are vectorized to create two vectors. Then, a correlation coefficient for the two vectors is computed. The correlation coefficient is a measure that quantifies the degree to which two sets of data are related or how they vary together. For each spectral band, there is a corresponding neural network in the decomposition network 106. As shown in FIG. 1, there are two neural networks 120 and 130. However, in practice, there are L neural networks, where L represents the number of spectral bands in the hyperspectral image. Neural network 120 includes convolutional block 121, residual block 122, residual block 123, and convolutional block 124, which may be interconnected as shown in FIG. 1. Similarly, neural network 130 includes convolutional block 131, residual block 132, residual block 133, and convolutional block 134, which may be interconnected as shown in FIG. 1. For each spectral band, there is a corresponding loss function for the decomposition network 106, represented as $L_{de}$, indicated at 146 and 147. Once the decomposition network 106 is initially trained with input hyperspectral images, the corresponding input RGB image is input into decomposition network 106. The output of the decomposition network 106 is the reconstructed hyperspectral image 138. The reconstructed hyperspectral image 138 is then input to a second neural network, which is fine-tuning network 140. Fine tuning network 140 includes convolutional block 141, residual block 142, residual block 143, and convolutional block 144, which may be interconnected as shown in FIG. 1. The output of the fine-tuning network 140 is reconstructed RGB image 152. The reconstructed RGB image 152 is compared with the input RGB image 102. Differences between the reconstructed RGB image 152 and the input RGB image 102 are determined, and are embodied in a corresponding loss function for the fine-tuning network 140, represented as $L_{ft}$, indicated at 154. In one or more embodiments, the second neural network (fine-tuning network 140) comprises a self-supervised network FIG. 2 is a diagram indicating additional details of the neural network architecture shown in FIG. 1, according to an embodiment. In particular, FIG. 2 shows additional details of a residual block such as shown at 122 in FIG. 1. The residual block includes a convolutional block 202. The convolutional block can include one or more convolutional layers. In embodiments, each convolutional layer/block includes a set of learnable filters (also known as kernels) that are applied to the input data. In one or more embodiments, for one or more convolutional layers, a corresponding kernel size for the convolutional layer is set to 3×3. Each kernel/filter is convolved with the input data to produce a feature map, which highlights the presence of particular patterns or features in the input. The convolution operation involves sliding the filter over the input data, performing element-wise multiplication and summing the results to produce a single value in the output feature map. In one or more embodiments, the first neural network (decomposition network 106) further comprises an activation function. The output of convolutional block 202 is fed to activation function 204. In one or more embodiments, the activation function 204 includes a non-linear activation function. In one or more embodiments, the activation function 204 includes a ReLU (Rectified Linear Unit). In one or more embodiments, the activation function 204 includes a Leaky ReLU (Rectified Linear Unit). The Leaky ReLU (Rectified Linear Unit) is a type of activation function used in artificial neural networks. It is similar to the standard ReLU function but allows a small, non-zero gradient when the input is negative, instead of setting the gradient to zero. In one or more embodiments, the Leaky ReLU activation function is defined as follows:

$$f(x) = \begin{cases} x, & \text{if } x > 0 \\ \alpha x, & \text{otherwise} \end{cases}$$

Where α is a small constant, such as 0.01, that determines the slope of the function for negative inputs. This can serve to reduce the probability of developing inactive neurons during training and/or operational use of the neural network.

The output of the activation function 204 can be input to another convolutional block 206. The output of convolutional block 206 can be fed to an additional activation function 208. In one or more embodiments, the activation function 208 can include a sigmoid function. The sigmoid function can be used to introduce non-linearity into the network. In one or more embodiments, the sigmoid function is defined as:

$$f(x) = \frac{1}{1 + e^{-x}}$$

Where e is the base of the natural logarithm. The sigmoid function has a characteristic S-shaped curve that maps any real value to a value between 0 and 1. This property makes it suitable for a wide variety of machine learning applications. In one or more embodiments, the activation function 208 can include a ReLU function instead of, or in addition to, the sigmoid function. Other embodiments can include a Tanh (hyperbolic tangent) activation function, softmax activation function, swish activation function, and/or other suitable activation function. In one or more embodiments, residual blocks can comprise at least two convolutional layers. In one or more embodiments, a first convolutional layer from the at least two convolutional layers is configured to perform feature extraction. In one or more embodiments, a second convolutional layer from the at least two convolutional layers is configured to perform feature map dimension reduction.

Figure 3:
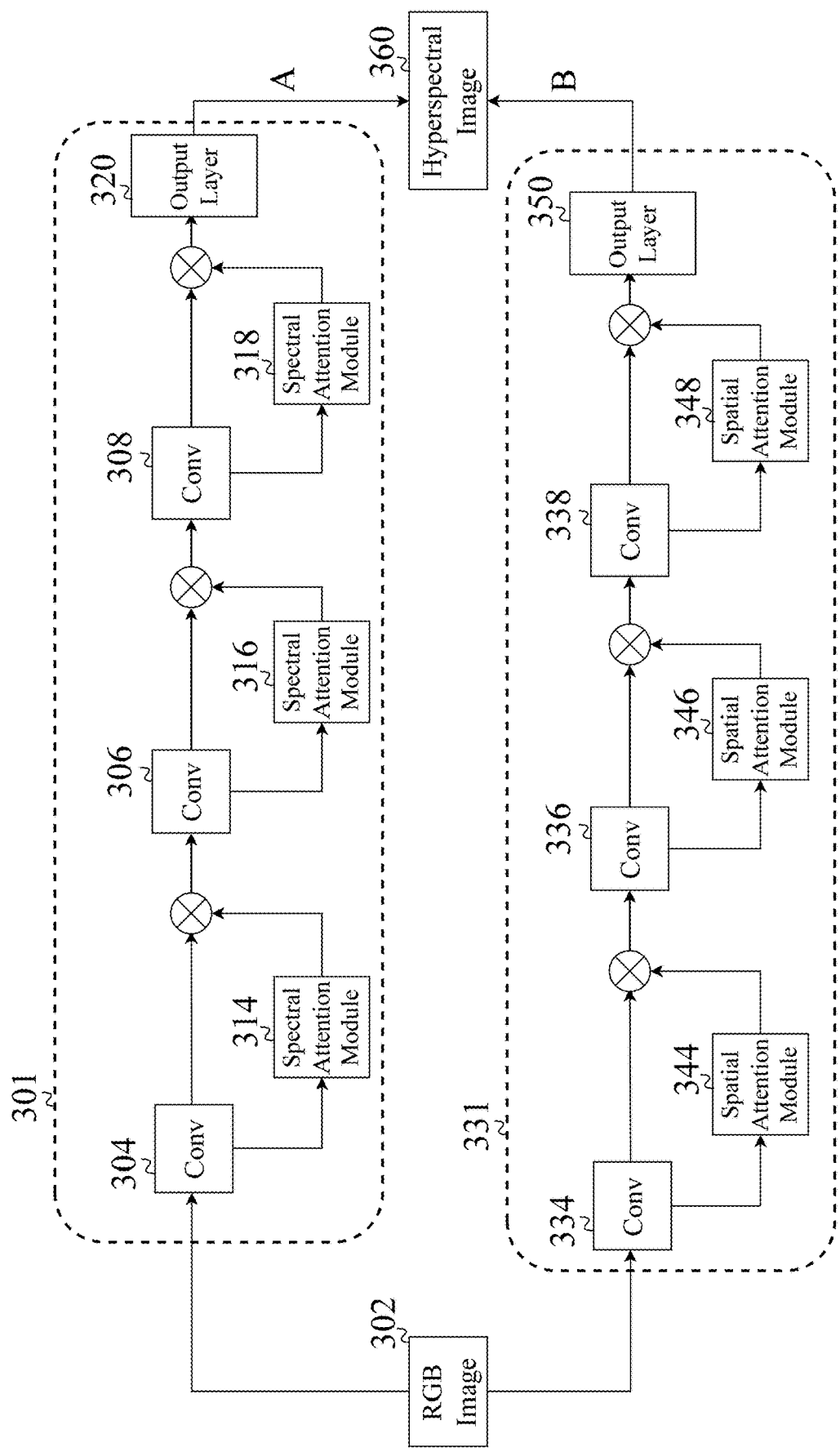
FIG. 3 is a diagram of a dual branch attention network, according to an embodiment.

FIG. 3 is a diagram of a dual branch attention network, according to an embodiment. In one or more embodiments, the decomposition network (106 of FIG. 1), and/or the fine-tuning network (140 of FIG. 1) may be implemented using a dual branch attention network instead of, or in addition to, the neural networks shown in FIG. 1. The dual branch attention network shown in FIG. 3 enables one or more embodiments to extract spectral and spatial features simultaneously from hyperspectral images. In one or more embodiments, small cubes are first cropped from the hyperspectral image and then fed into the dual branch attention network of FIG. 3, in order to extract features. An RGB image 302 is input to a first neural network 301, and also simultaneously input to a second neural network 331. The first neural network 301 is for processing spectral information, and includes convolutional block 304, spectral attention module 314, convolutional block 306, spectral attention module 316, convolutional block 308, spectral attention module 318, and output layer 320, which may be interconnected as shown in FIG. 3. The second neural network 331 is for processing spatial information, and includes convolutional block 334, spatial attention module 344, convolutional block 336, spatial attention module 346, convolutional block 338, spatial attention module 348, and output layer 350, which may be interconnected as shown in FIG. 3.

The attention modules shown in FIG. 3 can include a neural network architecture that focuses on learning to selectively pay attention to certain parts of the input RGB data. The attention modules of disclosed embodiments can dynamically weight the importance of different input elements such as spectral band information for a given pixel. This enables disclosed embodiments to identify relevant information while filtering out noise or irrelevant details, improving its performance on the task of generating a hyperspectral image from an input RGB image. The output from output layer 320 and output layer 350 are combined with respective weighting parameters A and B to generate a hyperspectral image 360 that is based on input RGB image 302.

In one or more embodiments, a first training phase can include pretraining the first neural network 301, and the second neural network 331 independently. A second training phase can then include providing a weighted summation layer and fine-tuning the entire network.

Figure 4:
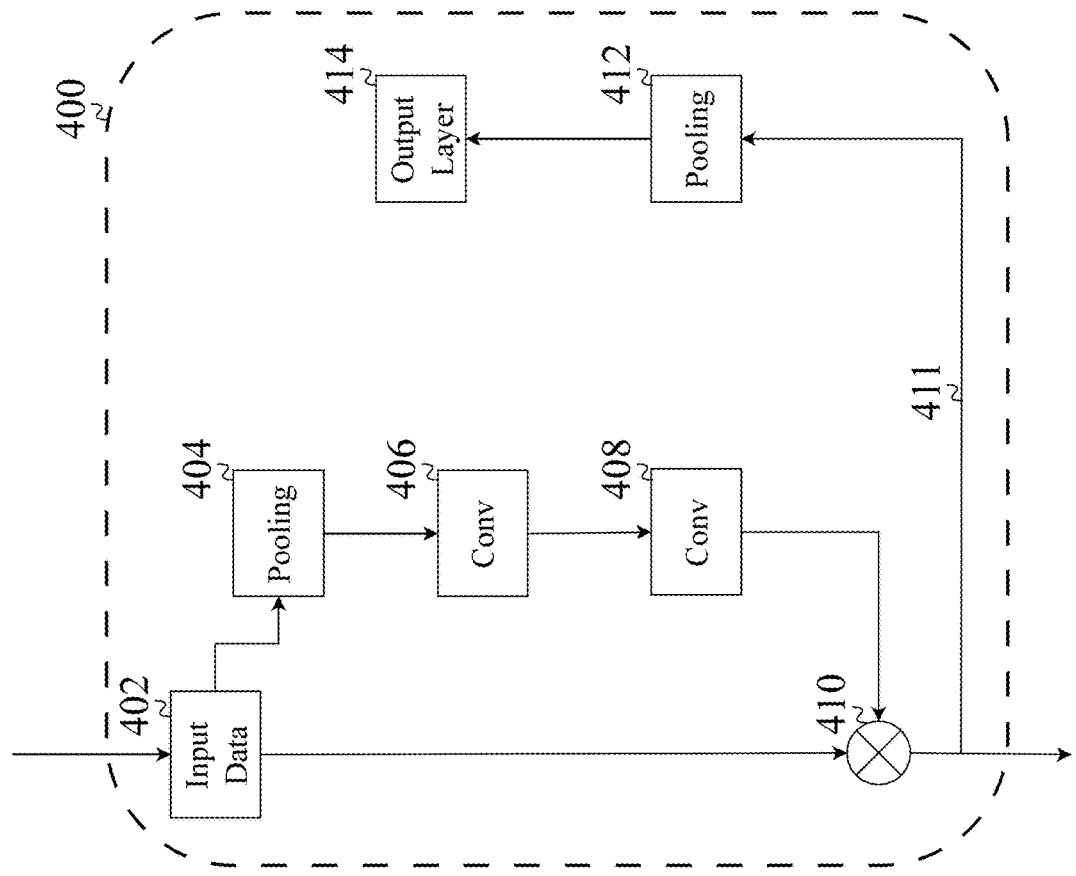
FIG. 4 is a diagram indicating details of a spectral attention module, according to an embodiment.

FIG. 4 is a diagram indicating details of a spectral attention module 400, according to an embodiment. Input data 402 can include hyperspectral image information of multiple channels. The input data 402 may be expressed as a feature map F of the form:

$$F^L \in G(C,H,W)$$

where C represents the channel number, H represents an input image height, and W represents an input image width, and where:

$$L \in \{1,2,3\}$$

The hyperspectral image information can be input to pooling layer 404, followed by convolutional block 406 and convolutional block 408. The pooling layer serves to reduce spatial dimension. The convolutional block 406 and convolutional block 408 can be implemented as 1-D convolutional layers to generate a spectral attention map. In one or more embodiments, a sigmoid function and/or ReLU function may be used as part of the convolutional block 406 and/or convolutional block 408. Elementwise multiplication can be performed by the element indicated at 410. The resulting output branch 411 connects to pooling layer 412. In one or more embodiments, pooling layer 412 can include a max-pooling layer. Pooling layer 412 can be followed by a fully connected output layer 414. The output branch 411 serves to provide supervised information for the spectral attention module, enabling a discriminative ability of a refined feature map. Moreover, the output branch 411 can serve to incorporate a regularization term to a loss function, which can help alleviate undesirable overfitting during the network training process.

Figure 5:
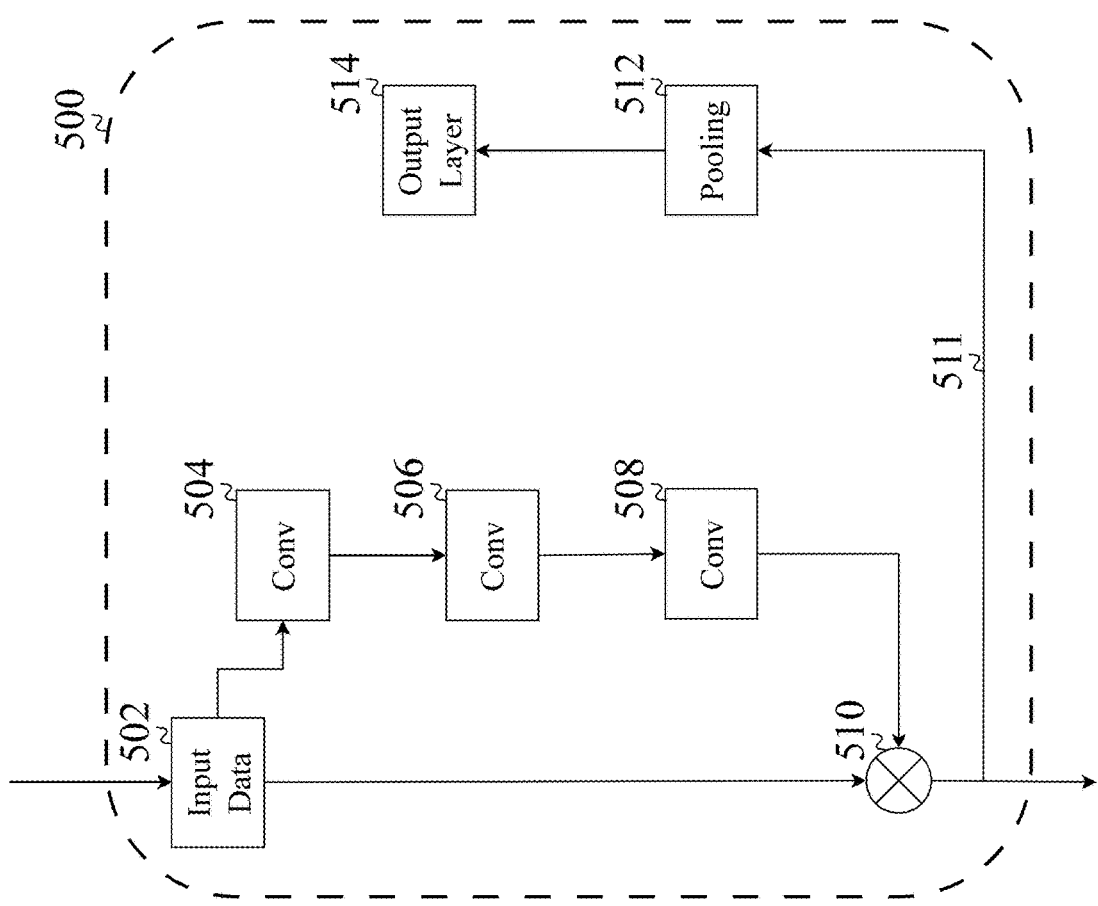
FIG. 5 is a diagram indicating details of a spatial attention module, according to an embodiment.

FIG. 5 is a diagram indicating details of a spatial attention module 500, according to an embodiment. Input data 502 can include hyperspectral image information of multiple channels. The input data 502 may be expressed as a feature map F of the form:

$$F^L \in G(C,H,W)$$

where C represents the channel number, H represents an input image height, and W represents an input image width, and where:

$$L \in \{1,2,3\}$$

The hyperspectral image information can be input to convolutional block 504, followed by convolutional block 506 and convolutional block 508. In one or more embodiments, convolutional block 504 can include a 1×1 convolutional layer to aggregate information along the channel direction of the feature map, resulting in a 2-D feature map. The convolutional block 506 and convolutional block 508 can include 2-D convolutional layers to generate a spatial attention map. In one or more embodiments, one or more of the convolutional blocks 504, 506, and 508 may also include padding operators. The padding operators can serve to avoid the change of spatial sizes. Elementwise multiplication can be performed by the element indicated at 510. The resulting output branch 511 connects to pooling layer 512. In one or more embodiments, pooling layer 512 can include an adaptive max-pooling layer. In one or more embodiments, the pooling layer 512 can be followed by output layer 514.

Detailed Description of Exemplary Aspects

Figure 9:
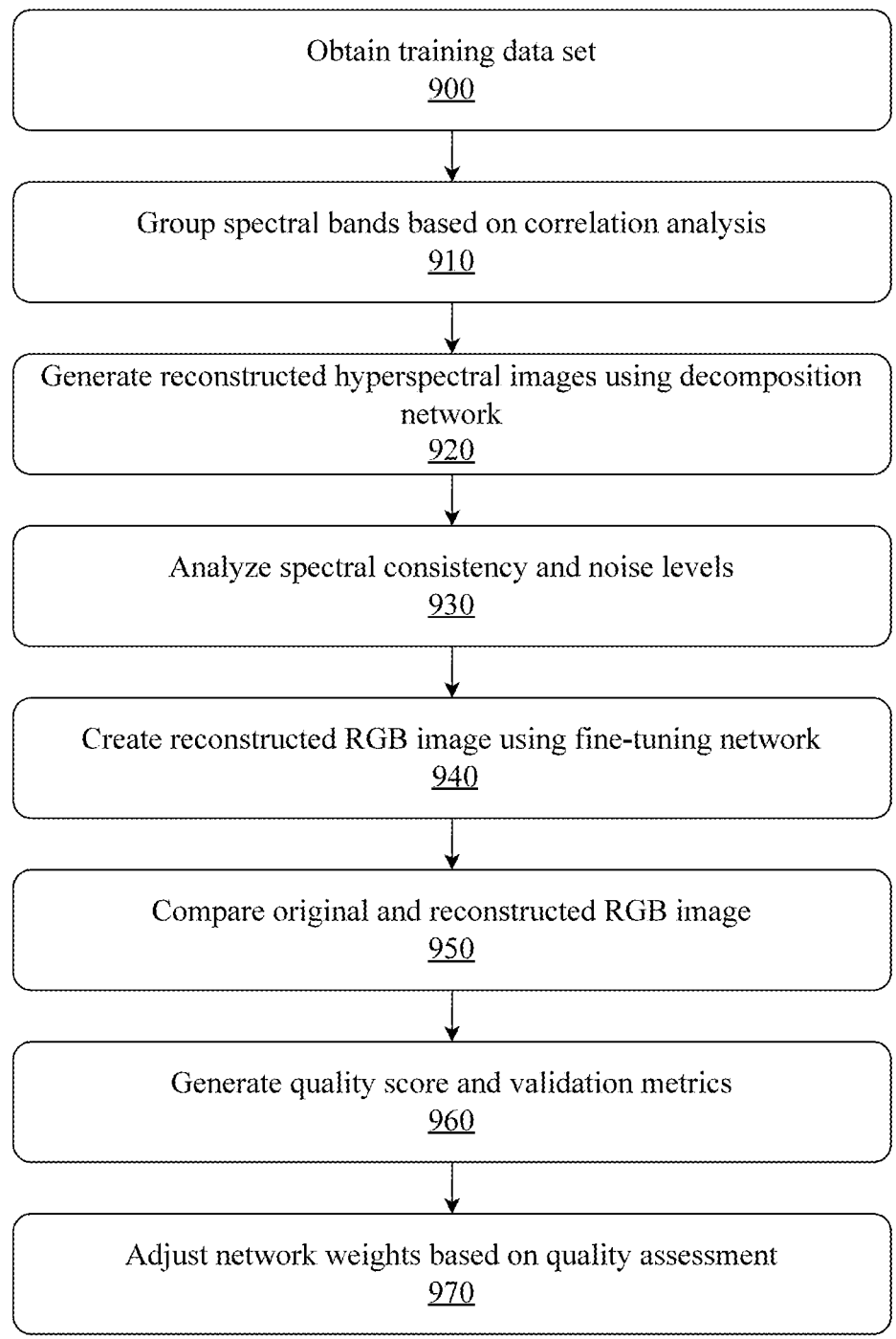
FIG. 9 is a flow diagram illustrating an exemplary method for hyperspectral image generation with quality assurance, according to an embodiment.

FIG. 9 is a flow diagram illustrating an exemplary method for hyperspectral image generation with quality assurance, according to an embodiment. In a first step 900, a training data set is obtained comprising input RGB images and their corresponding hyperspectral images. The input RGB images may be in various formats, including bayer format which comprises multiple sets of four pixels, where each set includes a red pixel, a blue pixel, and two green pixels.

In a step 910, spectral bands are grouped based on correlation analysis. This step involves computing correlation coefficients between pairs of spectral bands in the training hyperspectral images. The process includes vectorizing two spectral bands and computing their correlation coefficient, which quantifies the degree to which the bands are related. This process is repeated for all hyperspectral images in the training set to derive an averaged correlation matrix. A predetermined grouping threshold is used to determine if spectral bands should be in the same group.

In a step 920, reconstructed hyperspectral images are generated using the decomposition network. This network processes the input RGB image using various convolutional and residual blocks, incorporating the spectral band grouping information to generate a reconstructed hyperspectral image. The network's architecture enables it to learn the complex mapping relationship between RGB images and their corresponding hyperspectral representations. In a step 930, spectral consistency and noise levels are analyzed in the reconstructed hyperspectral image. This analysis includes computing band-to-band correlations to ensure smooth spectral transitions, evaluating the signal-to-noise ratio across different spectral bands, and detecting any artifacts or anomalies in the reconstruction. The analysis provides quantitative measures of the reconstruction quality from a spectral perspective.

In a step 940, a reconstructed RGB image is created using the fine-tuning network. This network processes the reconstructed hyperspectral image through its own set of convolutional and residual blocks to generate an RGB representation. The fine-tuning network serves as both a validation mechanism and a means to improve the quality of the hyperspectral reconstruction. In a step 950, the original and reconstructed RGB images are compared using multiple metrics. This comparison includes pixel-wise differences, structural similarity analysis, and color accuracy evaluation. These comparisons help quantify how well the reconstruction process preserves the original image information through the complete processing pipeline.

In a step 960, quality scores and validation metrics are generated based on the various analyses performed. These metrics combine the spectral consistency measurements, noise level assessments, and RGB comparison results using predetermined weights to create comprehensive quality indicators. The metrics are evaluated against established thresholds to determine if the reconstruction meets quality standards. In a step 970, network weights are adjusted based on the quality assessment results. These adjustments affect both the decomposition network and fine-tuning network, with the adjustments guided by the specific quality metrics that indicate areas needing improvement. This feedback loop enables continuous refinement of the reconstruction process, helping to maintain high-quality output in the generated hyperspectral images.

Figure 10:
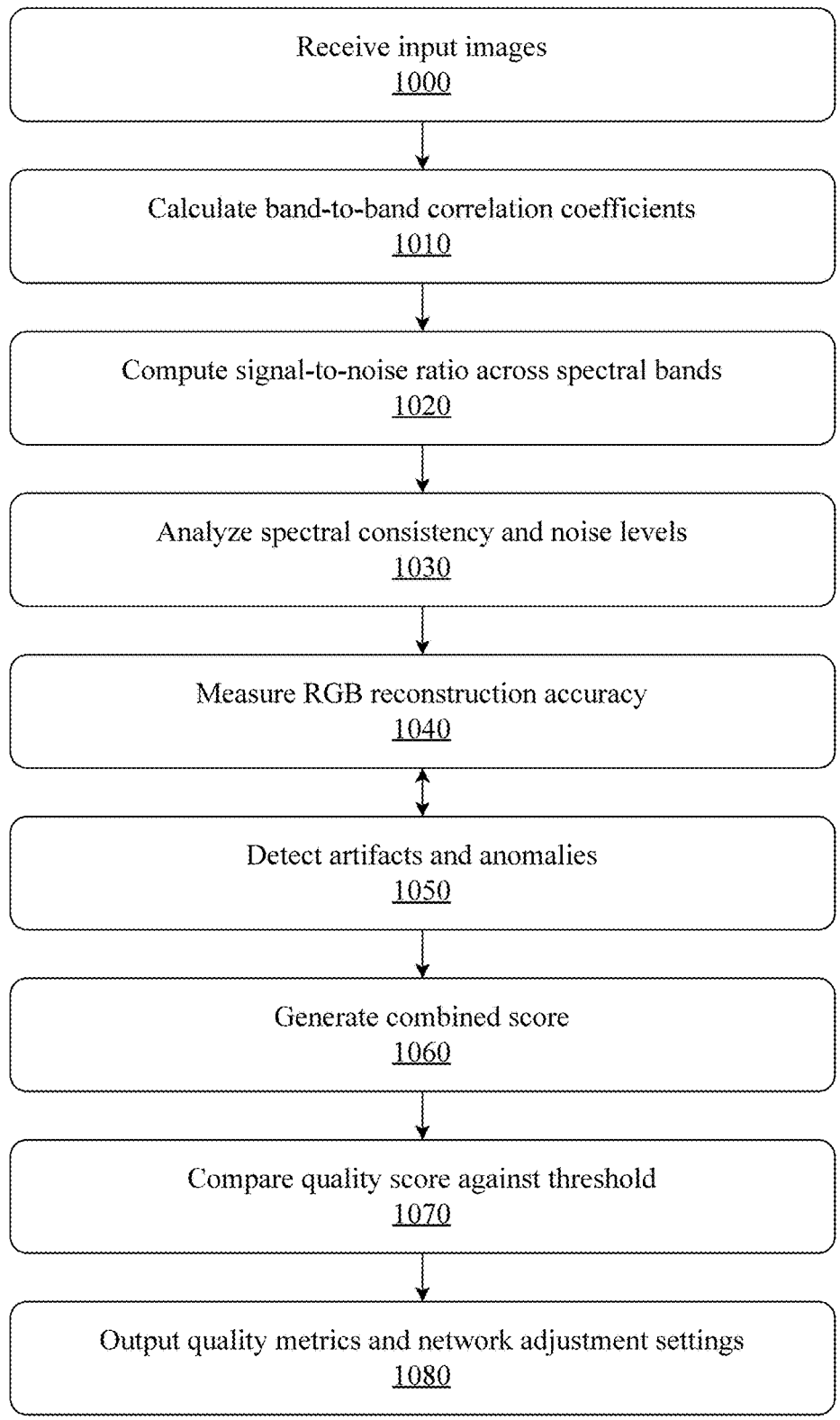
FIG. 10 is a flow diagram illustrating an exemplary method for calculating quality assessment scores for hyperspectral image generation, according to an embodiment.

FIG. 10 is a flow diagram illustrating an exemplary method for calculating quality assessment scores for hyperspectral image generation, according to an embodiment. In a first step 1000, quality assurance subsystem receives the original input RGB image, the reconstructed hyperspectral image generated by the decomposition network, and the reconstructed RGB image produced by the fine-tuning network. The input RGB image serves as the reference for quality assessment, while the reconstructed images represent the outputs to be evaluated.

In a step 1010, band-to-band correlation coefficients are calculated across the spectral bands of the reconstructed hyperspectral image. This calculation involves vectorizing adjacent spectral bands and computing their correlation coefficients. The process quantifies the relationship between neighboring wavelengths and helps identify any discontinuities or anomalies in the spectral reconstruction. The correlation analysis provides a measure of how well the spectral relationships are preserved in the reconstructed hyperspectral image. In a step 1020, the signal-to-noise ratio is computed across the spectral bands of the reconstructed hyperspectral image. This computation involves analyzing the relationship between the desired signal content and unwanted variations or noise in each spectral band. The signal-to-noise ratio provides a quantitative measure of image quality and helps identify bands that may require additional attention during the reconstruction process.

In a step 1030, spectral consistency and noise levels are analyzed using multiple metrics. This analysis examines the smoothness of transitions between spectral bands, evaluates the overall shape of spectral signatures, and assesses the presence of any systematic distortions or artifacts. The analysis helps ensure that the reconstructed hyperspectral image maintains physical validity and consistency across its spectral range. In a step 1040, RGB reconstruction accuracy is measured through multiple comparative analyses. This includes pixel-wise comparison between the original and reconstructed RGB images, evaluation of structural similarity to ensure preservation of image features and patterns, and specific assessment of color accuracy to verify proper reproduction of color relationships and intensities.

In a step 1050, artifacts and anomalies are detected in both the reconstructed hyperspectral image and the reconstructed RGB image. This detection process involves analyzing local variations, identifying unexpected patterns or distortions, and characterizing any reconstruction artifacts that may impact image quality. The process helps ensure the integrity of both spectral and spatial information in the reconstructed images. In a step 1060, a combined quality score is generated by integrating the various quality metrics using predetermined weights. This weighted combination takes into account the relative importance of different quality aspects, including spectral consistency, noise levels, RGB accuracy, and artifact presence. The combined score provides a comprehensive measure of reconstruction quality.

In a step 1070, the generated quality score is compared against predetermined thresholds to determine if the reconstruction meets quality standards. These thresholds are established based on application requirements and desired quality levels. The comparison helps ensure that only reconstructions meeting minimum quality standards are accepted. In a step 1080, quality metrics and network adjustment settings are output. These outputs include both the detailed quality metrics for documentation and specific feedback signals for adjusting the weights of the decomposition and fine-tuning networks. The feedback signals are designed to guide targeted improvements in the reconstruction process, enabling continuous refinement of the system's performance.

Figure 6:
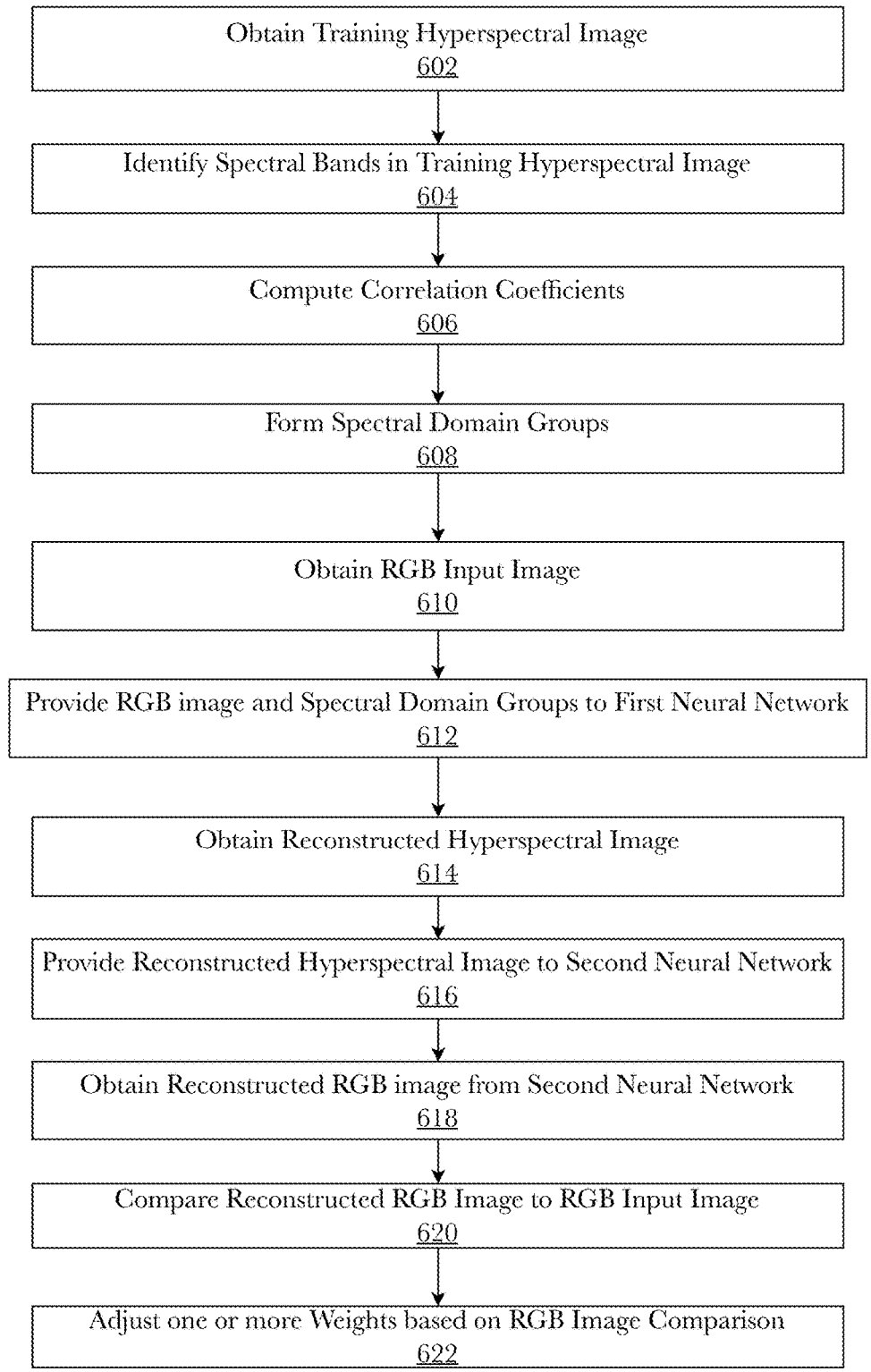
FIG. 6 is a flow diagram illustrating an exemplary method for hyperspectral image generation, according to an embodiment.

FIG. 6 is a flow diagram illustrating an exemplary method 600 for hyperspectral image generation, according to an embodiment. According to the embodiment, the process begins at step 602 where a training hyperspectral image is obtained. At step 604, spectral bands are identified in the training hyperspectral image. In one or more embodiments, the training hyperspectral image can include 20 bands covering a range from 500 nm to 700 nm, where each band is 10 nm wide. Other embodiments can include more or fewer bands, and cover different ranges. At step 606, correlation coefficients amongst pairs of spectral bands are computed. In one or more embodiments, computing correlation coefficients includes vectorizing two spectral bands, and then computing the correlation coefficient of the vector pairs. Embodiments can further include acquiring a correlation matrix with a dimension of L×L, where L is the number of spectral bands in the hyperspectral image used for training. This process can be repeated for all hyperspectral images in the training set, and an averaged correlation matrix can be derived. Based on the averaged correlation matrix, a predetermined grouping threshold can be derived. As an example, in one or more embodiments, a threshold of 0.8 is used as a grouping threshold to determine if spectral bands should be in the same group.

The method 600 continues to step 608 where spectral domain groups are formed based on the grouping threshold previously determined. The method 600 then continues to step 610, where the RGB input image is obtained. The RGB input image is part of the training data set, and corresponds to the training hyperspectral image that was obtained at step 602. At step 612, the RGB input image that was obtained at step 610, and the corresponding training hyperspectral image obtained at step 602, are input to a first neural network. The first neural network can include a decomposition network, such as shown at 106 of FIG. 1. The method 600 continues with obtaining a reconstructed hyperspectral image at step 614, such as reconstructed hyperspectral image 138 as shown in FIG. 1.

The method 600 continues with providing the reconstructed hyperspectral image to a second neural network at step 616. In one or more embodiments, the second neural network can include a fine-tuning network, such as shown at 140 in FIG. 1. The method 600 continues with providing the reconstructed hyperspectral image to the second neural network in step 616. The method 600 then continues with obtaining the reconstructed RGB image from the second network at step 618, followed by comparing the reconstructed RGB image to the RGB input image at step 620. Based on differences between the reconstructed RGB image and the RGB input image, one or more weights corresponding to the first neural network and/or second neural network are adjusted at step 622 to enable the reconstructed RGB image to increase in similarity to the RGB input image. Thus, the fine-tuning network of disclosed embodiments can serve to improve the efficacy of the decomposition network.

Exemplary Computing Environment

Figure 11:
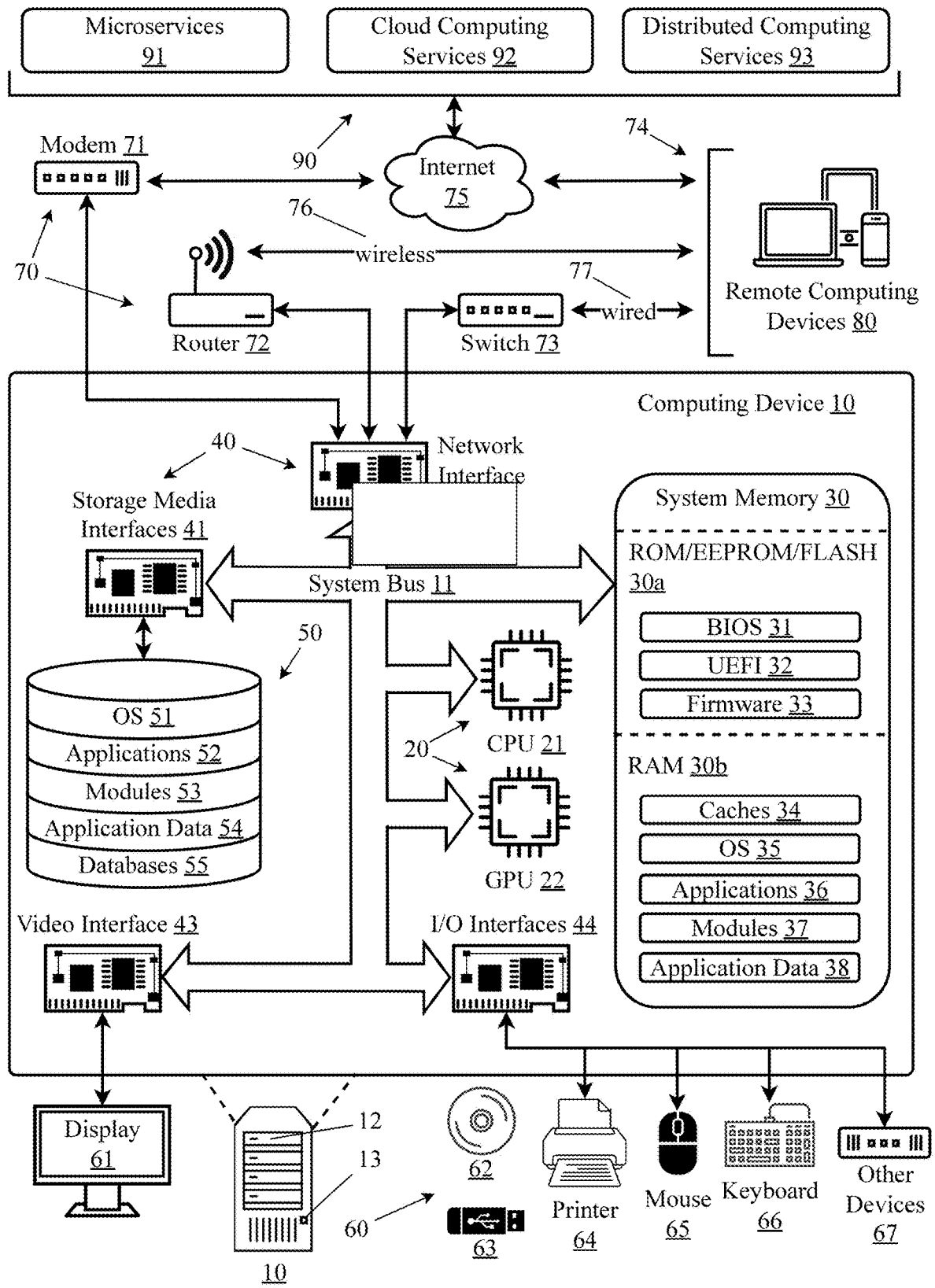
FIG. 11 illustrates an exemplary computing environment on which an embodiment described herein may be implemented, in full or in part.

FIG. 11 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed, or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed and includes memory types such as read only memory (ROM), electronically erasable programmable memory (EEPROM), and rewritable solid-state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, BOSQL databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is Docker, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containers or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, gRPC, or message queues such as Kafka. Microservices 91 can be combined to perform more complex processing tasks.

Cloud computing services 92 are delivery of computing resources and services over the Internet 75 from a remote location. Cloud computing services 92 provide additional computer hardware and storage on as needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

As can now be appreciated, disclosed embodiments provide effective techniques for generating hyperspectral images utilizing input RGB images that can be acquired from low-cost, readily available digital cameras. The hyperspectral images that are generated from disclosed embodiments can have a wide variety of applications and practical uses. These can include identifying various features in ariel photography images. The features can include, but are not limited to, healthy grass, stressed grass, synthetic grass, evergreen trees, deciduous trees, soil, water, roads, railways, crosswalks, cars, trains, and so on. Disclosed embodiments improve the technical field of hyperspectral image acquisition by enabling a decomposition network and a fine-tuning network operating in conjunction as part of a training and/or image analysis process.

The skilled person will be aware of a range of possible modifications of the various aspects described above. Accordingly, the present invention is defined by the claims and their equivalents.

What is claimed is:

1. A system for hyperspectral image generation with quality assurance, comprising:
   a computing device comprising at least a memory and a processor;
   a spectral band grouping module comprising a first plurality of programming instructions that, when operating on the processor, cause the computing device to:
      identify a plurality of spectral bands in a training hyperspectral image;
      compute a correlation coefficient of each spectral band of the plurality of spectral bands to at least one other spectral band of the plurality of spectral bands; and
      form a plurality of spectral domain groups based on the computed correlation coefficients;
   a decomposition module comprising a second plurality of programming instructions that, when operating on the processor, cause the computing device to:
      obtain the plurality of spectral domain groups from the spectral band grouping module;
      obtain an RGB (red-green-blue) input image;
      provide the RGB input image and plurality of spectral domain groups to a first neural network, wherein the first neural network includes at least one convolutional block, and at least one residual block; and
      obtain as an output of the first neural network, a reconstructed hyperspectral image, based on the RGB input image; and
   a quality assurance subsystem comprising a third plurality of programming instructions that, when operating on the processor, cause the computing device to:
      obtain the RGB input image, the reconstructed hyperspectral image, and a reconstructed RGB image;
      analyze a spectral consistency of the reconstructed hyperspectral image;
      evaluate a RGB reconstruction accuracy between the RGB input image and the reconstructed RGB image;
      analyze a plurality of noise characteristics in the reconstructed hyperspectral image and the reconstructed RGB image;
      generate a plurality of quality scores based on the spectral consistency, the RGB reconstruction accuracy, and the noise characteristics;
      compare the plurality of quality scores against a predetermined quality threshold; and
      update the first neural network based on the quality score comparisons.

2. The system of claim 1, further comprising a fine-tuning module comprising a third plurality of programming instructions that, when operating on the processor, cause the computing device to:
   provide the reconstructed hyperspectral image to a second neural network, wherein the second neural network includes at least one convolutional block, and at least one residual block;
   obtain as an output of the second neural network, a reconstructed RGB image;
   compare the reconstructed RGB image to the RGB input image by computing a spectral similarity metric between the reconstructed RGB image and the RGB input image, wherein the spectral similarity metric is based on correlation coefficients between corresponding spectral bands of the images; and
   adjust one or more weights of the first neural network based on the computed spectral similarity metric to minimize spectral distortion between the reconstructed RGB image to the RGB input image.

3. The system of claim 2, wherein the first neural network further comprises an activation function.

4. The system of claim 3, wherein the activation function comprises a ReLU layer.

5. The system of claim 2, wherein the second neural network comprises a self-supervised network.

6. The system of claim 1, wherein the at least one residual block of the first neural network comprises at least two convolutional layers.

7. The system of claim 6, wherein a first convolutional layer from the at least two convolutional layers is configured to perform feature extraction.

8. The system of claim 6, wherein a second convolutional layer from the at least two convolutional layers is configured to perform feature map dimension reduction.

9. A method for hyperspectral image generation with quality assurance, comprising steps of:
   identifying a plurality of spectral bands in a training hyperspectral image;
   computing a correlation coefficient of each spectral band of the plurality of spectral bands to at least one other spectral band of the plurality of spectral bands;
   forming a plurality of spectral domain groups based on the computed correlation coefficients;
   obtaining an RGB (red-green-blue) input image;
   providing the RGB input image and plurality of spectral domain groups to a first neural network, wherein the first neural network includes at least one convolutional block, and at least one residual block;
   obtaining as an output of the first neural network, a reconstructed hyperspectral image, based on the RGB input image;
   forwarding the RGB input image, the reconstructed hyperspectral image, and a reconstructed RGB image to a quality assurance subsystem;
   analyzing a spectral consistency of the reconstructed hyperspectral image;

evaluating a RGB reconstruction accuracy between the RGB input image and the reconstructed RGB image;

analyzing a plurality of noise characteristics in the reconstructed hyperspectral image and the reconstructed RGB image;

generating a plurality of quality scores based on the spectral consistency, the RGB reconstruction accuracy, and the noise characteristics;

comparing the plurality of quality scores against a predetermined quality threshold; and updating the first neural network based on the quality score comparisons.

10. The method of claim 9, further comprising the steps of:

providing the reconstructed hyperspectral image to a second neural network, wherein the second neural network includes at least one convolutional block, and at least one residual block;

obtaining as an output of the second neural network, a reconstructed RGB image;

comparing the reconstructed RGB image to the RGB input image by computing a spectral similarity metric between the reconstructed RGB image and the RGB input image, wherein the spectral similarity metric is based on correlation coefficients between corresponding spectral bands of the images; and adjusting one or more weights of the first neural network based on the computed spectral similarity metric to minimize spectral distortion between the reconstructed RGB image to the RGB input image.

11. The method of claim 10, wherein the first neural network further comprises an activation function.

12. The method of claim 11, wherein the activation function comprises a ReLU layer.

13. The method of claim 10, wherein the second neural network comprises a self-supervised network.

14. The method of claim 9, wherein the at least one residual block of the first neural network comprises at least two convolutional layers.

15. The method of claim 14, wherein for each convolutional layer, a corresponding kernel size for the convolutional layer is set to 3×3.

16. The method of claim 14, wherein a first convolutional layer from the at least two convolutional layers is configured to perform feature extraction.

17. The method of claim 14, wherein a second convolutional layer from the at least two convolutional layers is configured to perform feature map dimension reduction.

* * * * *